(12) United States Patent
Schroeder et al.

(10) Patent No.: US 11,668,352 B2
(45) Date of Patent: Jun. 6, 2023

(54) FINAL DRIVE ASSEMBLY, POWERTRAIN FOR A VEHICLE, AND METHOD OF CONTAINING A SHAFT

(71) Applicant: Honda Motor Co., Ltd., Tokyo (JP)

(72) Inventors: Dustin M. Schroeder, Milford Center, OH (US); L. Tyler Farrar, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 996 days.

(21) Appl. No.: 16/435,950

(22) Filed: Jun. 10, 2019

(65) Prior Publication Data

US 2020/0386276 A1    Dec. 10, 2020

(51) Int. Cl.
| | |
|---|---|
| *F16D 9/08* | (2006.01) |
| *F16C 3/02* | (2006.01) |
| *B60K 17/24* | (2006.01) |
| *B60K 17/22* | (2006.01) |

(52) U.S. Cl.
CPC ............. *F16D 9/08* (2013.01); *B60K 17/22* (2013.01); *B60K 17/24* (2013.01); *F16C 3/02* (2013.01)

(58) Field of Classification Search
CPC .......... F16D 9/08; F16C 3/02; F16C 2326/06; B60K 17/22; B60K 17/24; B60Y 2200/124; B60Y 2200/20
See application file for complete search history.

(56) References Cited

U.S. PATENT DOCUMENTS

| | | | | | |
|---|---|---|---|---|---|
| 2,524,853 | A | * | 10/1950 | Szekely ................... | F16H 1/48 475/330 |
| 2,773,369 | A | * | 12/1956 | Klemm ..................... | F16D 9/08 464/32 |
| 2,801,702 | A | * | 8/1957 | Armington ........... | B60K 17/306 475/346 |
| 2,848,882 | A | * | 8/1958 | Larsen .................... | F16F 15/10 464/97 |
| 3,274,855 | A | * | 9/1966 | Reynolds .............. | F16H 61/465 475/13 |
| 3,733,924 | A | * | 5/1973 | Zentz ...................... | F16H 47/04 475/72 |
| 4,218,896 | A | * | 8/1980 | van der Lely ........... | F16D 9/10 464/32 |
| 4,411,635 | A | * | 10/1983 | Boothroyd ............... | F16D 9/08 464/33 |
| 4,669,999 | A | * | 6/1987 | Miller ................. | F16L 55/1007 464/10 |

(Continued)

FOREIGN PATENT DOCUMENTS

| | | |
|---|---|---|
| EP | 1541424 A1 | 6/2005 |
| JP | H0740752 A | 2/1995 |
| JP | 3730417 B2 | 1/2006 |

*Primary Examiner* — Drew J Brown
*Assistant Examiner* — Timothy Wilhelm
(74) *Attorney, Agent, or Firm* — Kenealy Vaidya LLP (57) ABSTRACT

A front final drive assembly for a vehicle can include a housing and a first shaft rotatably supported inside the housing. The first shaft can include a breaking portion such that when a reaction torque applied to the first shaft exceeds a predetermined threshold the first shaft fractures at the breaking portion. The breaking portion can be a reduced diameter portion, and the breaking portion can be positioned inside the housing.

18 Claims, 5 Drawing Sheets

(56) References Cited

U.S. PATENT DOCUMENTS

| | | | | |
|---|---|---|---|---|
| 4,713,982 A * | 12/1987 | Fluegel | | F16H 47/04 |
| | | | | 60/788 |
| 4,743,776 A * | 5/1988 | Baehler | | F02N 11/04 |
| | | | | 290/22 |
| 4,932,280 A * | 6/1990 | Becker | | F04D 13/02 |
| | | | | 74/665 F |
| 4,989,707 A * | 2/1991 | Doty | | F16D 11/04 |
| | | | | 74/15.66 |
| 5,186,079 A * | 2/1993 | Gee | | B60K 17/22 |
| | | | | 403/2 |
| 5,566,777 A | 10/1996 | Trammer et al. | | |
| 5,983,497 A * | 11/1999 | Breese | | F16C 3/02 |
| | | | | 29/401.1 |
| 6,619,454 B2 * | 9/2003 | Hayward | | F16D 9/02 |
| | | | | 192/56.51 |
| 7,152,708 B2 * | 12/2006 | Campbell | | F16C 3/02 |
| | | | | 301/124.1 |
| 7,175,532 B2 * | 2/2007 | Tapazoglou | | F16C 3/02 |
| | | | | 280/833 |
| 8,132,640 B2 * | 3/2012 | Heitkamp | | B60K 17/24 |
| | | | | 248/608 |
| 8,794,370 B2 * | 8/2014 | Hiramatsu | | B62D 21/152 |
| | | | | 180/274 |
| 8,808,133 B2 * | 8/2014 | Carlton | | F16D 9/06 |
| | | | | 475/263 |
| 8,925,421 B2 * | 1/2015 | Vanderzyden | | F02C 7/32 |
| | | | | 74/730.1 |
| 8,926,590 B2 * | 1/2015 | Petroff | | A61B 5/0084 |
| | | | | 604/535 |
| 9,353,800 B2 * | 5/2016 | Carlton | | F16D 9/08 |
| 9,488,215 B2 * | 11/2016 | Campbell | | F16C 33/585 |
| 9,534,678 B2 * | 1/2017 | Imamori | | F16H 48/19 |
| 9,574,618 B2 * | 2/2017 | Lemmers, Jr. | | F16D 9/02 |
| 9,683,649 B2 * | 6/2017 | Demitroff | | F01M 5/005 |
| 10,099,551 B2 * | 10/2018 | Iwasaki | | B60K 17/354 |
| 10,458,481 B2 * | 10/2019 | Li | | F16D 1/0894 |
| 2006/0040753 A1 * | 2/2006 | Kai | | F16C 3/026 |
| | | | | 464/179 |
| 2014/0008170 A1 * | 1/2014 | Vanderzyden | | F16D 43/25 |
| | | | | 192/82 T |
| 2017/0274764 A1 * | 9/2017 | Iwasaki | | B60K 17/354 |
| 2018/0178858 A1 | 6/2018 | Hollman et al. | | |
| 2021/0131499 A1 * | 5/2021 | Corpus | | F16C 3/03 |

\* cited by examiner

FINAL DRIVE ASSEMBLY, POWERTRAIN FOR A VEHICLE, AND METHOD OF CONTAINING A SHAFT

BACKGROUND

The disclosed subject matter relates to a powertrain for a vehicle. More particularly, the disclosed subject matter relates to methods and apparatus that contain a shaft in a housing of a final drive assembly.

Vehicles can include a powertrain that generates an output torque that is used to propel the vehicle. The powertrain can include an internal combustion engine as the power source, a multi-ratio transmission that can convert the output torque generated by the engine into a drive torque, and at least one shaft that transfers the drive torque to a final drive assembly. The final drive assembly can be configured to distribute the drive torque to a pair of wheel connected to the final drive assembly.

SUMMARY

Some embodiments are directed to a front final drive assembly for a vehicle can include a housing and a first shaft rotatably supported inside the housing. The first shaft can include a breaking portion such that when a reaction torque applied to the first shaft exceeds a predetermined threshold the first shaft fractures at the breaking portion. The breaking portion can be a reduced diameter portion, and the breaking portion can be positioned inside the housing.

Some embodiments are directed to a powertrain for a vehicle having a front end and a rear end spaced apart in a longitudinal direction of the vehicle. The powertrain can include an engine, a transmission, a propeller shaft, a final drive assembly, a first output shaft, and a second output shaft. The engine can be configured to produce an output torque. The transmission can be connected to the engine and configured to receive the output torque and convert the output torque to a drive torque. The propeller shaft can be connected to the transmission and configured to transmit the drive torque. The final drive assembly can be configured to output the drive torque to a pair of wheels. The final drive assembly can include a housing, a differential drive assembly and a first shaft. The differential drive assembly can be mounted inside the housing. The first shaft can be rotatably supported inside the housing and connected to the differential drive assembly and the propeller shaft such that the first shaft transmits the drive torque from the propeller shaft to the differential drive assembly. The first shaft can include a breaking portion configured such that when a reaction torque applied to the first shaft exceeds a predetermined threshold the first shaft fractures at the breaking portion before the propeller shaft fractures. The breaking portion can be a reduced diameter portion, and the breaking portion is housed inside the housing. The first output shaft can be selectively driven by the differential drive assembly. The second output shaft can be selectively driven by the differential drive assembly. The differential drive assembly can be configured to drive the first output shaft and the second output shaft in unison in a first mode and at different relative rotational speeds in a second mode.

Some embodiments are directed to a method for containing a shaft of a drivetrain of a vehicle. The method can include: providing a housing and a shaft rotatably supported inside the housing; connecting the shaft to a source of a drive torque; connecting the shaft to at least one wheel of the vehicle such that the shaft transmits the drive torque to the at least one wheel; and forming a breaking portion at a predetermined location on the shaft such that if a reaction torque applied to the shaft exceeds a predetermined threshold the shaft fractures at the breaking portion resulting in two broken ends that remain within the housing.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
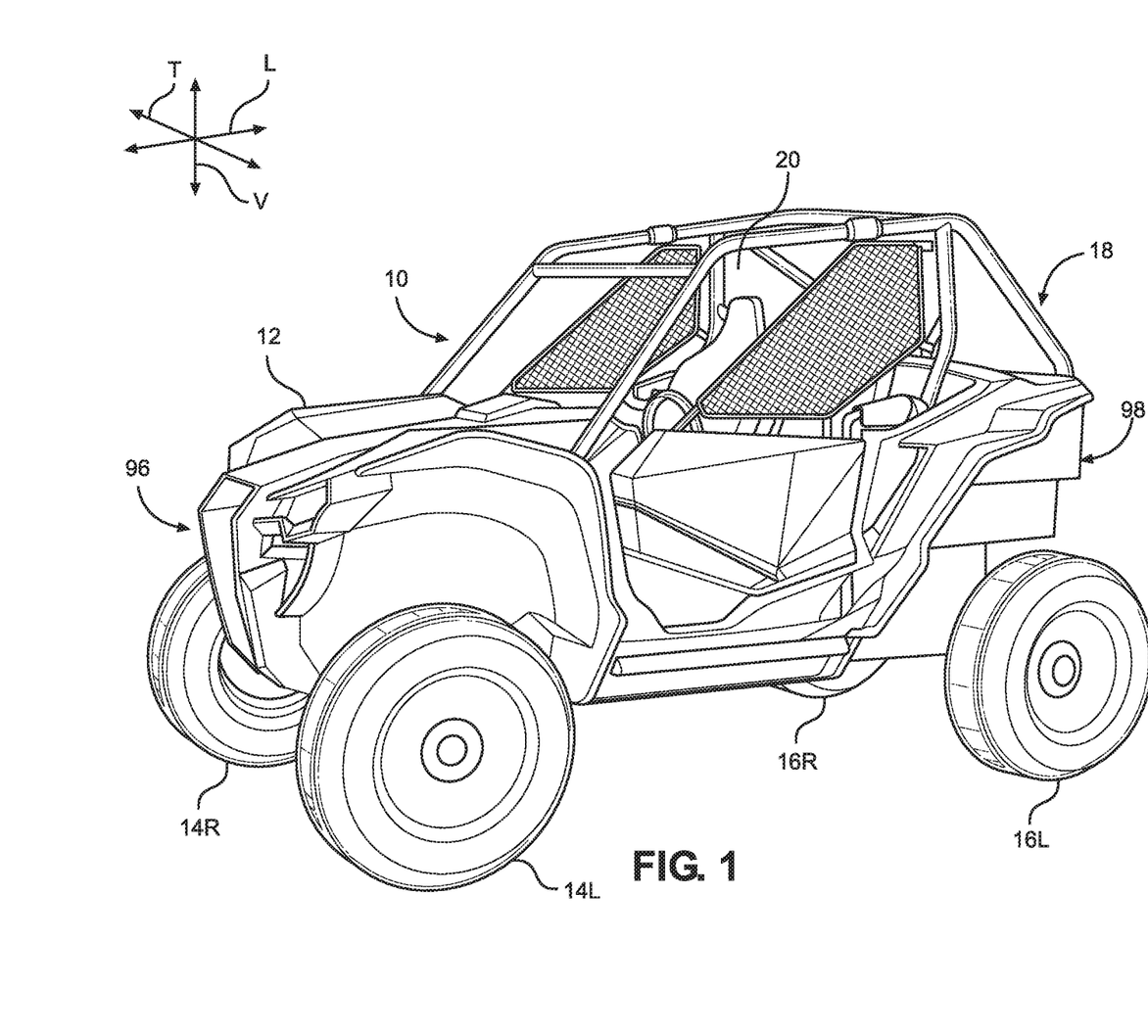
FIG. 1 is side view of a vehicle made in accordance with principles of the disclosed subject matter.

FIG. 1 illustrates an embodiment of a vehicle 10 made in accordance with the principles of the disclosed subject matter. The vehicle 10 shown in FIG. 1 is specialized for use on an unimproved path or on an unmarked path, and can be referred to as a multipurpose utility vehicle (MUV) or as a side-by-side all-terrain vehicle (S×S, or S×S ATV). However, the disclosed vehicle 10 can be any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc.

Figure 2:
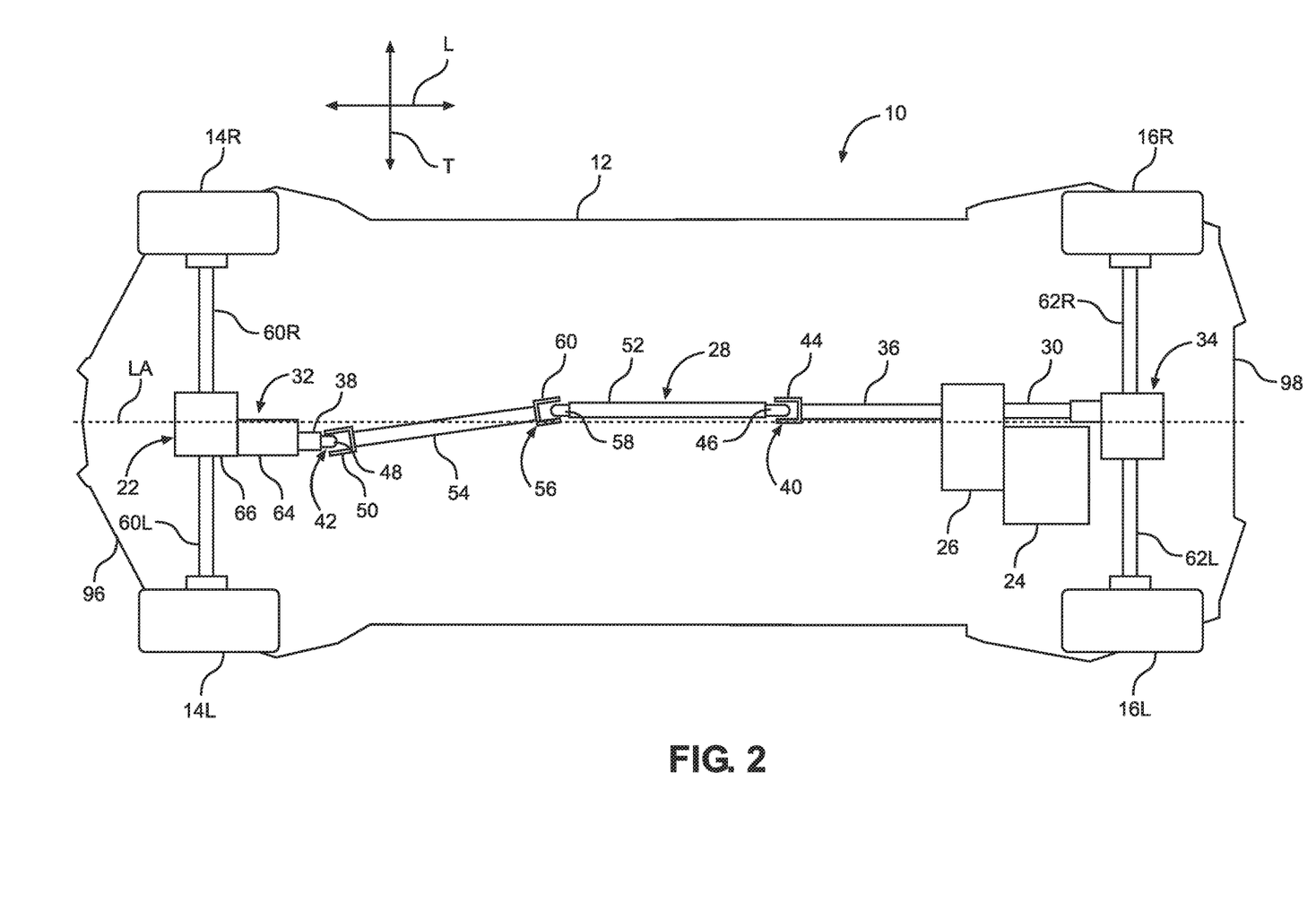
FIG. 2 is a schematic plan view of the vehicle of FIG. 1 showing a powertrain layout in accordance with the disclosed subject matter.

Referring to FIGS. 1 and 2 collectively, the vehicle 10 can include a longitudinal direction L, a transverse direction T and vertical direction V. Referring to FIG. 1, the vehicle 10 can include a body 12, a pair of front wheels, 14L, 14R, a pair of rear wheels 16L, 16R and a frame assembly 18. The body 12 and the frame assembly 18 can surround or extend about a perimeter of a passenger space 20. The passenger space 20 can include one or more seats and the controls, such as but not limited to a steering wheel, a brake pedal, an accelerator pedal and a transmission switch/lever, for operating the vehicle 10. In the exemplary embodiment of FIG. 1, the passenger compartment can accommodate a driver and a passenger in a single row of two seats. However, exemplary embodiments can include two more rows of seats, with each row of seats including two or more seats. The frame assembly 18 can include a roll cage configured to extend around and above the passenger space 20. Referring to FIGS. 1 and 2, the vehicle 10 can include a front end 96 and a rear end 98 spaced from the front end 96 along a longitudinal direction L of the vehicle 10.

Referring to FIG. 2, the vehicle 10 can include a powertrain 22. The powertrain can include a power source 24, a transmission 26, a front propeller shaft 28, a rear propeller shaft 30, a front final drive assembly 32 and a rear final drive assembly 34. The power source 24 can be configured to produce an output torque. The transmission 26 can be connected to the power source 24 by a shaft with or without a clutch assembly between the shaft and either of the transmission 26 or the power source 24 and configured to receive an output torque from the power source 24 and convert the output torque to a front drive torque. The front propeller shaft 28 can be connected to the transmission 26 and configured to transmit the front drive torque to the front final drive assembly 32. The front final drive assembly 32 can be located adjacent to the front end 96 of the vehicle 10 and configured to output the front drive torque to the front wheels 14L, 14R. The transmission 26 can be configured to output a rear drive torque in addition to the front drive torque. The rear propeller shaft 30 can be connected to the transmission 26 and configured to transmit the rear drive torque to the rear final drive assembly 34. The rear final drive assembly 34 can be located adjacent to the rear end 98 of the vehicle 10 and configured to output the rear drive torque to the rear wheels 16L, 16R.

The vehicle 10 of FIGS. 1 and 2 can be configured as a four-wheel drive vehicle in which the power source 24 drives the front wheels 14L, 14R and the rear wheels 16L, 16R. However, the vehicle 10 can be configured as a two-wheel drive vehicle where only the front wheels 14L, 14R are driven by the power source 24, or only the rear wheels 16L, 16R are driven by the power source 24. As will be described in further detail below, the exemplary vehicle 10 can have a first drive mode in which the power source 24 only drives the rear wheels 16L, 16R and a second drive mode in which the power source drives the front wheels 14L, 14R and the rear wheels 16L, 16R.

When travelling along an unimproved path or an unmarked path, the vehicle 10 can encounter path surface or path obstruction that can prevent at least one of the driven wheels 14L, 14L, 16L, 16R from turning despite a drive torque transmitted from the power source 24 to the at least one of driven wheel 14L, 14R, 16L, 16R. This can create a reaction torque in one or more of the shafts of the powertrain 22. As will be described in further detail below, one of the shafts of the powertrain 22 can include a breaking portion that is contained inside a housing of the powertrain such that when a reaction torque exceeds a predetermined threshold the shaft fractures at the breaking portion and results in two broken ends that are contained within the housing.

The power source 24 can be an internal combustion engine, an electric motor, or a hybrid of an internal combustion engine and an electric motor. The power source 24, especially when configured as an internal combustion engine or a hybrid power source, can have the engine output axis oriented in the longitudinal direction L or in a traverse direction T of the vehicle. The engine can be mounted forward of the front axles, rearward of the rear axles, or intermediate the front and rear axles. In the exemplary embodiment of FIG. 1, the power source is configured as a longitudinally-oriented and intermediate-mounted internal combustion engine.

The transmission 26 can be an automatic transmission, a manual transmission, or a semi-automatic transmission. A coupling between the power source 24 and the transmission can permit selective connection and disconnection of the transmission to and from the output torque, in any appropriate manner such as but not limited to a friction disc clutch and a torque converter. The transmission 26 can include a speed ratio assembly that is configured to convert the output to a drive torque. The speed ratio assembly can be a stepped speed ratio assembly or a continuously variable speed ratio assembly.

The rear propeller shaft 30 can extend into the respective housing of each of the transmission 26 and the rear final drive assembly 34. The rear propeller shaft 30 can be connected to a respective shaft inside each of the transmission 26 and the rear final drive assembly 34. Alternatively, one or both of the transmission 26 and the rear final drive assembly 34 can include a shaft that extends outside of the respective one of the housings that is connected to the rear propeller shaft 30 at a location that is outside each of the transmission 26 and the rear final drive assembly 34.

The front propeller shaft 28 can extend from the transmission 26 to the front final drive assembly 32 along the longitudinal direction L of the vehicle 10. The front propeller shaft 28 can be connected to a respective shaft of each of the transmission 26 and the front final drive assembly 32 at a location that is inside of or outside of the respective one of the housings of the transmission 26 and the front final drive assembly 32. In the exemplary embodiment of FIG. 2, the transmission 26 can include a transmission output shaft 36 and the front final drive assembly 32 can include a front input shaft 38. The front propeller shaft 28 can be connected to each of the transmission output shaft 36 and the front input shaft 38.

A respective one of a pair of universal joint assemblies 40, 42 can connect the propeller shaft 28 to each of the transmission output shaft 36 and the front input shaft 38. Each of the universal joint assemblies can transmit torque to and from the front propeller shaft 28 if the rotational axis of the front propeller shaft 28 is at an angle with respect to the rotational axis of either or both of the transmission output shaft 36 and the front input shaft 38. The angle can be a static angle where the rotational axes are fixed with respect to each other. Alternatively, the angle can be a dynamic angle that varies because one of the shafts can pivot about the universal joint with respect to the other shaft.

For example, the first universal joint assembly 40 can include a first yoke 44 fixed to the transmission output shaft 36, a second yoke 46 connected to the front propeller shaft 28, and a cross member pivotally connected to each of the yokes 44, 46 such that the cross member pivots within each of the yokes 44, 46 as the shafts 28, 36 rotate if the rotational axes of the shafts 28, 36 are at angle with respect to each other. The second universal joint 42 can include a third yoke 48 connected to the front input shaft 38, a fourth yoke 50 connected to the front propeller shaft 28, and a cross member pivotally connected to each of the yokes 48, 50 such that the cross member pivots within each of the yokes 48, 50 as the shafts 28, 38 rotate if the rotational axes of the shafts 28, 38 are at angle with respect to each other.

The front propeller shaft 28 can be a single shaft that extends from the transmission output shaft 36 to the front input shaft 38. Alternatively, as shown in the exemplary embodiment of FIG. 2, the front propeller shaft 28 can include a pair of propeller shafts 52, 54 and a third universal joint assembly 56.

The first propeller shaft 52 can be connected to the transmission output shaft 36. The first propeller shaft 52 can extend from the transmission output shaft 36 to the second propeller shaft 54. The first propeller shaft 52 can extend substantially parallel to a longitudinal axis LA of the vehicle 10, and can be spaced away (or offset) from the longitudinal axis LA in a transverse direction T of the vehicle 10.

The second propeller shaft 54 can be connected to each of the front input shaft 38 and the first propeller shaft 52. The second propeller shaft 54 can extend from the first propeller shaft 52 to the front input shaft 38. The second propeller shaft 54 can extend in both of the longitudinal direction L and the transverse direction T of the vehicle 10 such that the second propeller shaft 54 is at an angle with respect to the longitudinal axis LA of the vehicle 10. Further, the second propeller shaft 54 can have an axis of rotation that is at an angle with respect to an axis of rotation of each of the first propeller shaft 52 and the front input shaft 38. The second yoke 46 can be connected to one end of the first propeller shaft 52 and the fourth yoke 50 can be connected to one end of the second propeller shaft 54.

The third universal joint assembly 56 can connect the first propeller shaft 52 to the second propeller shaft 54. For example, the third universal joint assembly 56 can include a fifth yoke 58 fixed to the second end of the first propeller shaft 52, a sixth yoke 60 connected to the second end of the second propeller shaft 54, and a cross member connected to each of the yokes 58, 60 such that the cross member pivots within each of the yokes 58, 60 as the shafts 52, 54 rotate since the rotational axes of the shafts 52, 54 are at angle with respect to each other. The angle between the rotational axes of the shafts 52, 54 can be a static angle where the rotational axes are fixed with respect to each other or a dynamic angle where one of the shafts 52, 54 can pivot about the cross member with respect to the other of the shafts 52, 54. In the exemplary embodiment of FIG. 2 one or both of the propeller shafts 52, 54 can be supported on the frame 18 by a respective rubber mount such that the angle between the rotational axes is a dynamic angle due to the inertia of the shafts 52, 54, the movement of the power source 24 relative to the frame assembly 18 and the movement of the shaft(s) 52, 54 within the respective rubber mount.

The powertrain 22 can include a pair of front driveshafts 60L, 60R and a pair of rear driveshafts 62L, 62R. The front driveshafts 60L, 60R can be connected to and driven by the front final drive assembly 32 based on the front torque input to the front final drive assembly 32 by the front propeller shaft 28. The rear driveshafts 62L, 62R can be connected to and driven by the rear final drive assembly 34 based on rear drive torque input to the rear final drive assembly 34 by the rear propeller shaft 30.

The front final drive assembly 32 can include any appropriate structure, such as but not limited to a pinion and a bevel gear assembly, a differential drive assembly, a clutch assembly, or any combination thereof, that can receive the front drive torque from the front propeller shaft 28 and distribute the front drive torque to one or both of the front driveshafts 60L, 60R. Further details of the front final drive assembly 32 will be described below.

The rear final drive assembly 34 can include any appropriate structure, such as but not limited to a pinion and a bevel gear assembly, a differential drive assembly, a clutch assembly, or any combination thereof, that can receive the front drive torque from the rear propeller shaft 30 and distribute the front drive torque to one or both of the front driveshafts 62L, 62R.

The rear final drive assembly 34 can be identical to or different from the front final drive assembly 32. For example, the rear final drive assembly 34 can include a locking differential drive assembly that, in a first mode, can selectively drive each of the rear driveshafts 62L, 62R at the same speed or at different speeds under varying traction conditions and, in a second mode, can lock the rotation of the rear driveshafts 62L, 62R such that the rear driveshafts 62L, 62R rotate in unison independently of varying traction conditions. In contrast, the front final drive assembly can include a limited-slip differential drive assembly that can selectively drive each of the front driveshafts 60L, 60R at the same speed or at different speeds under varying traction conditions in a first mode and can lock the rotation of the front driveshafts 60L, 60R such that the front driveshafts 60L, 60R rotate in unison under predetermined varying traction conditions.

II. Front Final Drive Assembly

In the exemplary embodiment shown FIGS. 1-5, the front final drive assembly 32 can include a housing and a shaft, where the shaft includes a breaking portion that is contained inside the housing of the front final drive assembly 32 such that when a reaction torque exceeds a predetermined threshold the shaft fractures at the breaking portion and results in two broken ends that are contained within the housing. Further, the predetermined threshold can be set such that the shaft of the front final drive assembly 32 fractures at the breaking point before any of the front propeller shaft 28 and the front driveshafts 60L, 60R fractures due to the reaction torque.

Figure 3:
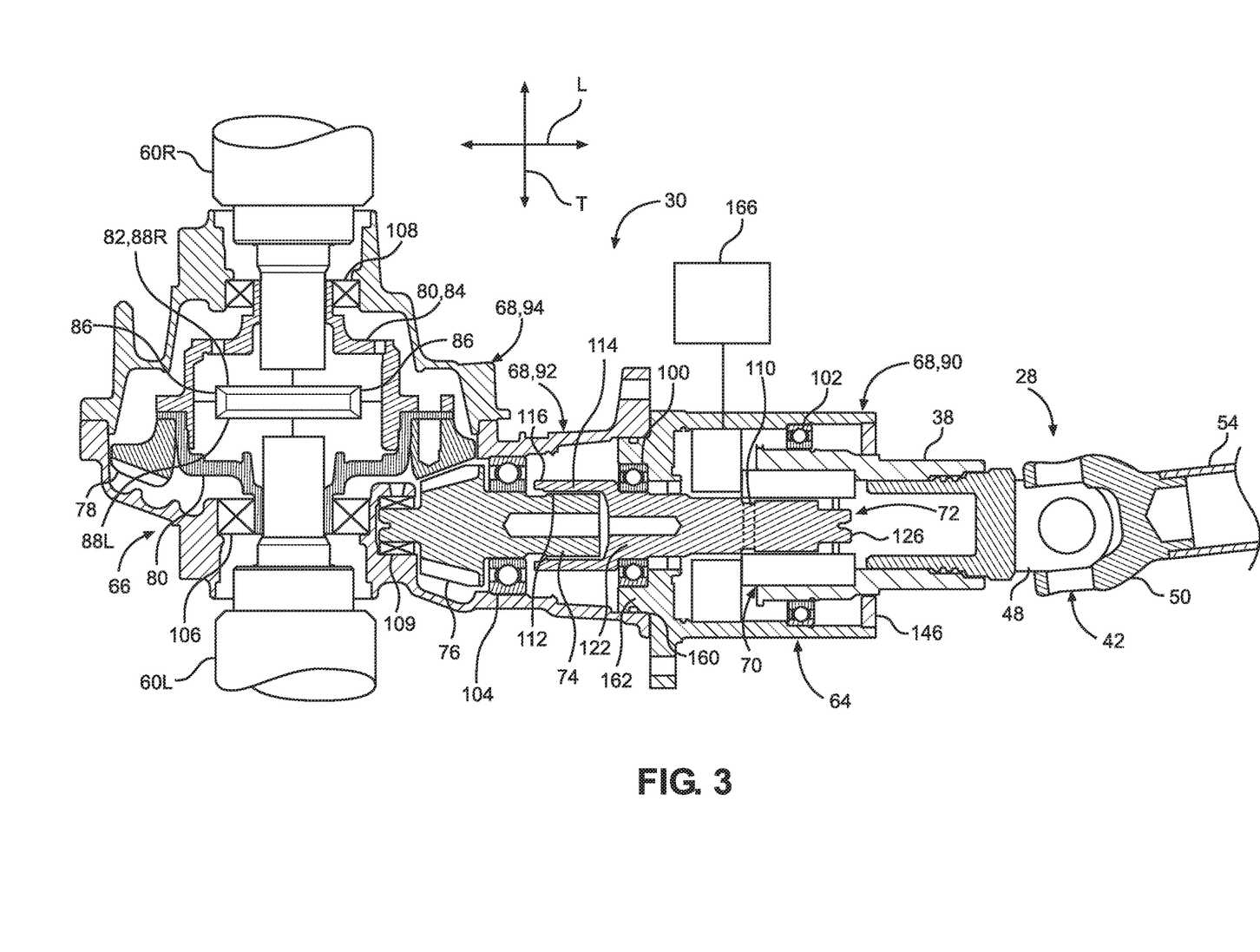
FIG. 3 is cross-sectional view of an exemplary final drive assembly in accordance with the disclosed subject matter and usable in the powertrain of FIG. 2, and schematically illustrates an exemplary coupling structure of the final drive assembly.

Referring to FIGS. 2 and 3, the front final drive assembly 32 can include an intermediate coupling assembly 64, a front differential drive assembly 66 and a housing 68. Referring to FIG. 3, the housing 68 can contain the intermediate coupling assembly 64 and the front differential drive assembly 66 inside the housing 68. The intermediate coupling assembly 64 can be configured to selectively connect the front propeller shaft 28 to the front differential drive assembly 66. For example, the intermediate coupling assembly 64 can operate in a first mode where the intermediate coupling assembly 64 transmits the front drive torque from front propeller shaft 28 to the front differential drive assembly 66 and in a second mode where the intermediate coupling assembly 64 transmits some or none of the front drive torque to the front differential drive assembly 66.

Figure 4:
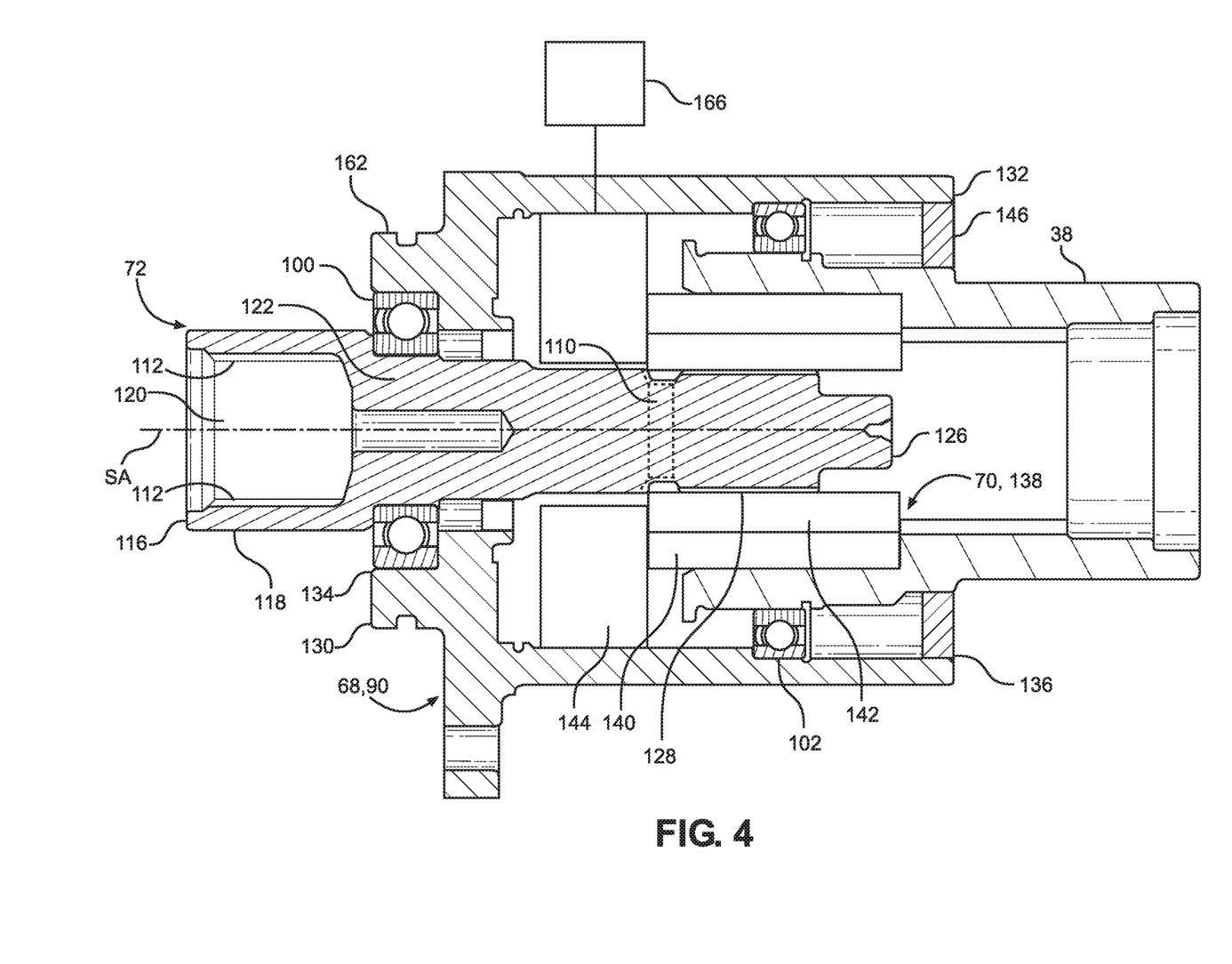
FIG. 4 is an enlarged portion of FIG. 3 that shows an exemplary intermediate coupling assembly of the final drive assembly of FIG. 3, and schematically represents a portion of an exemplary embodiment of the coupling structure of FIG. 3.

Referring to FIG. 3, the intermediate coupling assembly 64 can include the front input shaft 38, a coupling structure 70 and a first shaft 72 mounted inside the housing 68. FIGS. 3 and 4 schematically illustrates the coupling structure 70 and each feature of the coupling structure 70 described below. The coupling structure 70 can include any appropriate coupling device, such as but not limited to a clutch assembly, a differential drive assembly or a combination thereof, that can selectively transmit all, some or none of the front drive torque from the front propeller shaft 28 to the front differential drive assembly 66.

As will be described in further detail below, the first shaft 72 can include a breaking region 110 demarcated between the dashed lines in each of FIGS. 3-5. Further, as shown in FIG. 3, the first shaft 72 can be contained within the housing 68. Thus, when the front wheels 14L, 14R are driven by the powertrain 22 and the powertrain 22 is subjected to a reaction torque input via the front wheels 14L, 14R, where the reaction torque exceeds a predetermined threshold, the first shaft 72 can fracture at the breaking region 110 resulting in two broken ends that can be contained within the housing 68.

The front differential drive assembly 66 can include a final input shaft 74, an input gear 76, a final drive gear 78, a differential input structure 80 and a differential output structure 82. FIG. 3 schematically illustrates the differential output structure 82 and a portion of the differential input structure 80.

The first shaft 72 of the intermediate coupling assembly 64 can be connected to the final input shaft 74 and can drive the final input shaft 74 when the coupling structure 70 transmits some or all of the front drive torque from the propeller shaft 28 to the first shaft 72. The first shaft 72 can be connected to the final input shaft 74 by any appropriate structure that permits the first shaft 72 to drive the final input shaft 74 at the same rotational speed at which the first shaft 72 rotates. For example, the first shaft 72 can include a plurality of splines 112 and the final input shaft 74 can include a plurality of splines 114 that mesh with the splines 112 on the first shaft 72. In the exemplary embodiment of FIGS. 3 and 4, the splines 112 of the first shaft 72 are internal splines and the splines 114 of the final input shaft 74 are external splines. However, the spline arrangement can be reversed such that the splines 112 of the first shaft 72 are external splines and the splines 114 of the final input shaft 74 are internal splines.

The input gear 76 can be connected to and rotate in unison with the final input shaft 74. In the exemplary embodiment of FIG. 3, the input gear 76 can be integrally formed with the final input shaft 74 as a single homogenous unit. However, alternate embodiments can include an input gear 76 that is formed separately from the final drive shaft 74 and then subsequently connected to the final drive shaft by any appropriate structure such as but not limited to mating splines.

The final drive gear 78 can rotate about a rotational axis that is at an angle with respect to the rotational axis of the input gear 76. For example, the input gear 76 can rotate about a rotational axis that extends along the longitudinal axis L of the vehicle 10 and the final drive gear 78 can rotate about a rotational axis that extends along the transverse direction T of the vehicle 10 such that the rotational axis of the final drive gear 78 forms an angle with the rotational axis of the input gear 76 that is substantially ninety degrees. However, exemplary embodiments can include any appropriate angle formed between the rotational axes of the input gear 76 and the final drive gear 78. Each of the input gear 76 and the final drive gear 78 can include meshing gear teeth that can transfer torque from the input gear 76 to the final drive gear 78. The input gear 76 can be referred to as a pinion gear and the final drive gear 78 can be referred to as a bevel gear.

The differential input structure 80 can be connected to and driven by the final drive gear 78. The differential output structure 82 can be connected to and driven by the differential input structure 80. The differential output structure 82 can be connected to drive each of the front driveshafts 60L, 60R at the same speed or at different speeds, including rotating one of the front driveshafts 60L, 60R at a maximum speed while not rotating the other of the front driveshafts 60L, 60R. That is, the differential output structure 82 can rotate in unison with the differential input structure 80 in a first mode and the differential input structure 80 can rotate at a different speed relative to the differential output structure 82 in a second mode. For example, the differential input structure 80 and the differential output structure 82 can be configured as a friction drive assembly, a differential gear drive assembly, or a combination thereof.

For example, the differential input structure 80 can include a carrier 84 connected to the final drive gear 78 and at least one gear 86 rotatably supported on the carrier 84. (FIG. 3 schematically illustrates a pair of gears 86). The differential output structure 82 can include a gear 88L, 88R fixed to each of the front driveshafts 60L, 60R and meshing with the at least one gear 86 such that the gears 88L, 88R (and the front driveshafts 60L, 60R) can rotate relative to the at least one gear 86 and relative to each other. That is, the differential input structure 80 and the differential output structure 82 can be configured as an open-type differential gear assembly, or as a limited-slip-type differential gear assembly, or as a selectively lockable-type differential gear assembly.

The housing 68 can include one or more housing sections. In the exemplary embodiment of FIG. 3, the housing 68 can include a first housing section 90, a second housing section 92 and a third housing section 94. The second housing section 92 can be connected to the first housing section 90 and extend from first housing section 90 along the longitudinal direction L of the vehicle 10. The second housing section 92 can extend from the first housing section 90 and toward the front end 96 of the vehicle 10 along the longitudinal direction of the vehicle 10. The third housing section 94 can be connected to and extend from the second housing section 92 along the transverse direction T of the vehicle 10. The second and third housing sections 92, 94 can contain and rotatably support the front differential drive assembly 66. The first and second housing sections can contain portions of the intermediate coupling assembly 64 and rotatably support portions of the intermediate coupling assembly 64.

The intermediate coupling assembly 64 can include a first bearing 100 and a second bearing 102. The second bearing 102 can rotatably support the front input shaft 38 on the inside of the first housing section 90. The first bearing 100 can rotatably support the first shaft 72 on the inside of the first housing section 90. The first and second bearings 100, 102 can include any appropriate bearing structure. In the exemplary embodiment of FIGS. 3 and 4, the first and second bearings 100, 102 are rolling element bearings that can include an inner race fixed to the outer circumferential surface of the front input shaft 38 and the outer circumferential surface of the first shaft 72, respectively, and an outer race that is fixed to the inner circumferential surface of the first housing section 90, and rolling elements that roll along opposing surfaces of the inner and outer races. In the exemplary embodiment of FIGS. 3 and 4, the rolling elements are configured as balls and the opposing surfaces of the races can include grooves in which the balls roll. The first and second bearings 100, 102 are configured to accommodate radial loads input by the shafts 38, 72. However, the first and second bearings 100, 102 can accommodate at least a minimal axial load due to grooves formed in the inner and outer races in which the balls roll.

The front differential drive assembly 68 can include a fourth bearing 104, a fifth bearing 106, a sixth bearing 108 and a seventh bearing 109. FIG. 3 schematically illustrates each of the fourth, sixth and seventh bearings 106, 108, 109. The bearings 104, 106, 108 can include any appropriate bearing structure.

For example, the fourth and seventh bearings 104, 109 can rotatably support the final input shaft 74 on the inside of the second housing section 92. The fifth bearing 106 can rotatably support a first portion of the differential input structure 80 on an inside of the second housing section 92. The sixth bearing 108 can rotatably support the carrier 82 of the differential input structure 80 on an inside of the third housing section 94. The bearings 104, 106, 108, 109 can be configured as rolling element bearings. For example, the fourth, fifth and sixth bearings 104, 106, 108 can include ball rolling elements and the seventh bearing 109 can include cylindrical rolling elements. The fourth, fifth and sixth bearings 104, 106, 108 can be configured as a radial bearing and can be referred to as a ball bearing. Further, grooves in the bearing races of the fifth and sixth bearings can permit the fifth and sixth bearings 106, 108 to accommodate axial loads. Alternatively, the fifth and sixth bearings 106,108 can be configured as roller bearings in which the cylindrical rolling elements rotate about an axis that is at an angle with respect to each of the radial direction and the axial direction of the bearings 106, 108 such that the bearings 106, 108 can accommodate radial loads and axial loads input by the front driveshafts 60L, 60R. The fifth and sixth bearings 106, 108 can be tapered roller bearings. The seventh bearing 109 can be configured as a radial roller bearing.

Referring to FIGS. 3 and 4, the first shaft 72 can extend into and out of the first housing section 90 such that the first shaft 72 includes a first portion located outside of the first housing section 90 and contained in the second housing section 92 and a second portion contained in the first housing section 90. The front input shaft 38 (also referred to as a second shaft) can extend into and out of the first housing section 90 such that the front input shaft 38 includes a first portion contained in the first housing section 90 and a second section located outside of the first housing section 90 (and outside of the housing 68).

Figure 5:
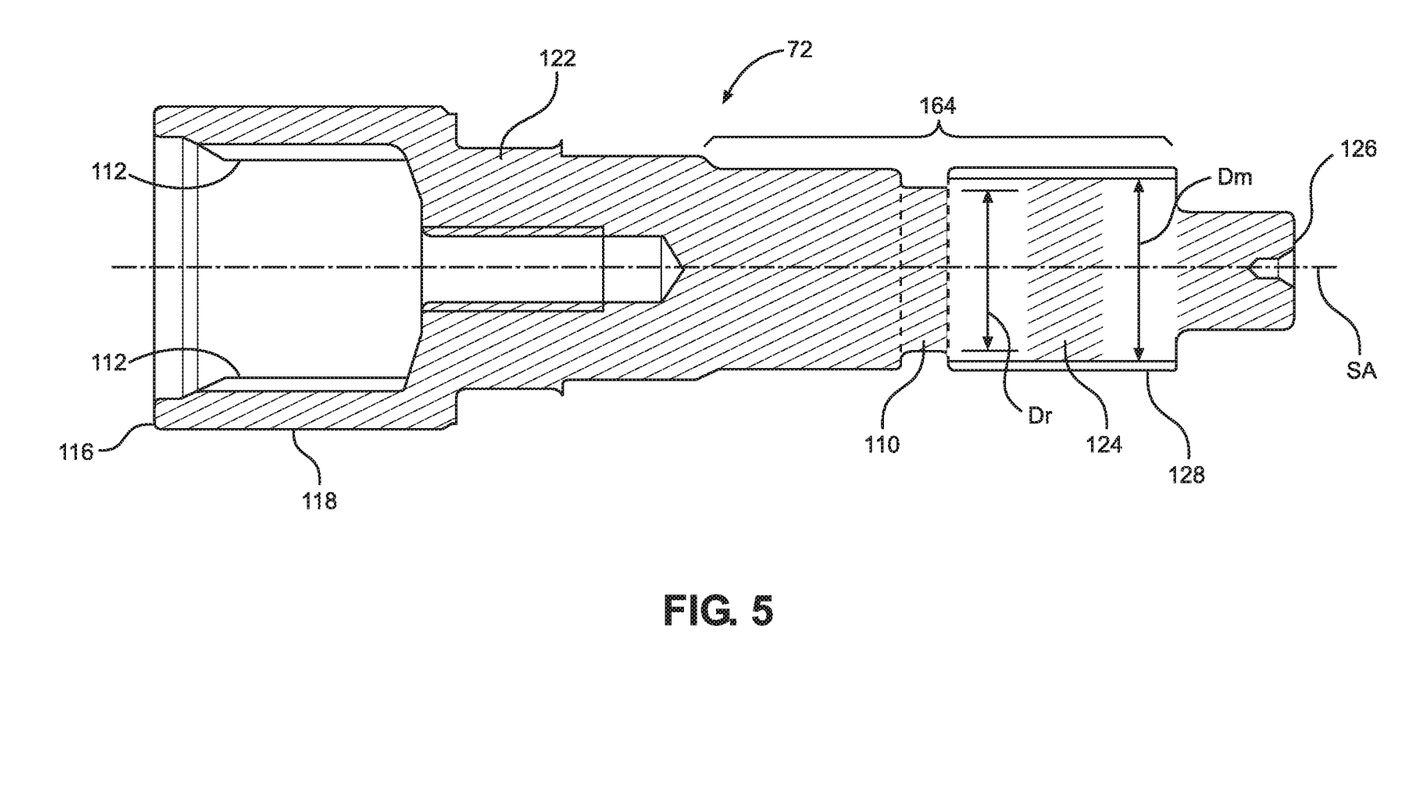
FIG. 5 is a cross-section view of a shaft of FIGS. 3 and 4.

Referring to FIGS. 3-5 collectively, the first portion of the first shaft 72 can include a first end 116, an enlarged portion 118 and a blind bore 120. The internal splines 112 can be formed in the blind bore 120. FIGS. 4 and 5 show only two of the plurality of internal splines 112 for simplicity and clarity of the drawing. However, any appropriate number of the internal splines 112 can be used. Further, the internal splines 112 can be equally distributed about the circumferential surface of the blind bore 120. The final input shaft 74 can extend into the blind bore 120 when the external splines 114 of the final input shaft 74 engage the internal splines 112 of the first shaft 72.

The breaking region 110 can be a reduced diameter portion of the first shaft 72 such that the diameter of the outer circumferential surface of the first shaft 72 measured at the breaking region 110 is less than the diameter of the outer circumferential surface of the first shaft 72 measured at a pair of locations on the first shaft 72 where each of the locations is adjacent to a respective side of the breaking region 110 along the shaft axis SA. That is, the reduced diameter portion can be a concavity in the outer surface of the first shaft 72.

The second portion of the first shaft 72 can include a support portion 122 that is rotatably supported inside the first housing section 90 and a second end 126 that is located inside the first housing section 90. The second end 126 can be spaced away from the support portion 122 along the shaft axis SA of the first shaft 72. The shaft axis SA can extend substantially parallel to the longitudinal axis L of the vehicle 10. The breaking region 110 can be located between the support portion 122 and the second end 126.

The support portion 122 can be a bearing portion on which the first bearing 100 is fixed. The second bearing 102 can indirectly and rotatably support the second end 126 of the first shaft 72 via the coupling structure 70 and the front input shaft 38. The breaking region 110 can be located between the first bearing 100 and the second bearing 102 along the shaft axis SA (i.e., along an axial direction of the first shaft 72).

The first shaft 72 can include a plurality of splines 128 formed adjacent to the second end 126. The breaking region 110 can be located between the splines 112 and the splines 128 along the shaft axis SA.

The support portion 122 (also referred to as a bearing portion) can be spaced away from the first end 116 and rotatably supported by the first housing section 90 of the housing 68 via the first bearing 100. The breaking region 110 can be located between the support portion 122 and the splines 128. Further, the splines 128 can be located between the breaking portion 110 and the second end 126 of the first shaft 72.

Referring to FIG. 5, the splines 128 can be configured as external splines. The splines 128 can have a minor diameter Dm that is the distance between the bases of two diametrically opposed splines 128. The reduced diameter portion of the breaking region 110 can include a reduced diameter Dr that is less than the minor diameter Dm of the splines 128.

In an exemplary embodiment, the reduced diameter Dr can be the smallest shaft diameter of any portion of the first shaft 72 that transmits torque. However, any portion of the first shaft 72 that does not transmit torque can have a diameter that is less than the reduced diameter Dr. For example, an end portion of the first shaft 72 that includes the second end 126 does not transmit torque and the diameter of the outer circumferential surface at the end portion can be less than the reduced diameter Dr.

The first shaft 72 can have an outer circumferential surface. The breaking region 110 abuts two portions of first shaft 72 that have an outer diameter that is greater than the reduced diameter Dr such that the breaking region 110 is a concavity that extends around the circumference of the outer surface and the reduced diameter Dr is measured at the base of the concavity. That is, the breaking region 110 can be a circumferential groove in the outer circumferential surface that encircles the outer circumferential surface.

Referring to FIG. 4, the first housing section 90 of the housing 68 can include a first end 130, a second end 132, a first opening 134 in the first end 130 and second opening 136 in the second end 132. The first shaft 72 can extend through the first opening 134 and into the second housing section 92. The first shaft 72 can be spaced away from the second opening 136. The front input shaft 38 can extend through the second opening 136 and into the first housing section 90. The breaking region 110 can be spaced inwardly away from each of the first opening 134 and the second opening 136. Thus, if the first shaft 72 fractures at the breaking region 110 when a reaction torque is input to the powertrain 22 by the front wheels 14L, 14R and exceeds a predetermined threshold, then the two broken ends of the first shaft 72 can be contained within the housing 68.

Referring to FIGS. 3 and 4 collectively, the second housing section 92 can include a third opening 160. The first housing section 90 can include an annular protrusion 162 that extends in the longitudinal direction L of the vehicle 10. The annular protrusion 162 can extend through the third opening 160 and into the second housing section 92. The first shaft 72 can extend through the first opening 134 and the third opening 160 such that the first end 116 of the first shaft 72 is located inside the second housing section 92 and the second end 126 of the first shaft 72 is located inside the first housing section 90.

Referring to FIGS. 3 and 4, the intermediate coupling assembly 64 can include an end cap assembly 146 mounted in the second opening 136 of the first housing section 90. The end cap assembly 146 can be annular and the front input shaft 38 can pass through the end cap assembly 146. The end cap assembly 146 and the front input shaft 38 together can close the second opening 136. The end cap assembly 146 can be configured in any appropriate manner to form a seal between the front input shaft 38 and the second opening 136 of the first housing section 90.

In the exemplary embodiment of FIG. 4, the coupling structure 70 can include a clutch assembly 138. FIG. 4 schematically illustrates the coupling structure 70, the clutch assembly 138, and the features of the coupling structure and the clutch assembly 138 described below. The clutch assembly 138 can include an input structure 140, an output structure 142 and an actuator 144 that selectively connects and disconnects the input structure 140 to and from output structure 142. FIG. 4 schematically illustrates the input structure 140, the actuator 144 and the output structure 142. The input structure 140 can be connected to and rotate with the front input shaft 38. The output structure 142 can be connected to the first shaft 72 such that the first shaft rotates with the output structure 142. The actuator 144 can be fixed to the inner surface of the first housing section 90. The actuator 144 can be any appropriate structure such as but not limited to a solenoid or a piston that causes relative movement between the input structure 140 and/or the output structure 142 such that the input structure 140 selectively engages and disengages to and from the output structure 142.

For example, the input structure 140 can include at least one friction plate that is splined to the front drive shaft 38. The output structure 142 can include at least one friction plate (schematically illustrated) that is connected to the splines 128 of the first shaft 72.

The breaking point 110 can be located between the internal splines 112 and the external splines 128 of the first shaft 128. Since the internal splines 112 of the first shaft 72 mesh with the external splines 114 on the final input shaft 74, the breaking point 110 can be located between the torque transmitting portions of the first shaft 72. Further, the reduced diameter Dr can be the smallest outer diameter of the portion of the first shaft 72 that extends between the torque transmitting portions of the first shaft 72.

As described above, the first shaft 72 includes a blind bore 120. The blind bore 120 can also be referred to as a hollow portion of the first shaft 72. As shown in FIGS. 3-5, the breaking region 110 can be spaced away from the hollow portion of the first shaft 72. Further, the first shaft 72 can include solid structure 164 that is devoid of openings or hollow sections that extend inside outer surface of the first shaft 72 such that the material from which the first shaft 72 is made can extend continuously along between diametrically opposed locations on the outer surface of the first shaft 72. The breaking region 110 can be formed on the solid structure 164 of the first shaft 72.

The intermediate coupling assembly 64 can include an actuation system 166 that can cause the coupling structure to selectively connect and disconnect the front input shaft 38 to and from the first shaft 72. The actuation system 166 can be a manual system, a fully automated system, or a semi-automated system. If the actuation system 166 is configured as a manual system, then the actuation system can depend on an input from an operator of the vehicle 10 to cause the coupling structure 70 to selectively connect and disconnect the front input shaft 38 to and from the first shaft 72. If the actuation system 166 is configured as a fully automated actuation system, then the actuation system 166 can include an electronic control unit configured to receive at least one input signal and cause the coupling structure 70 to selectively connect and disconnect the front input shaft 38 to and from the first shaft 72 based on the input signal(s). If the actuation system 166 is configured as a semi-automated actuation system, then the actuation system 166 can be similar to the exemplary automated system with an input from a user being provided before the electronic control unit can cause the coupling structure 70 to selectively connect and disconnect the front input shaft 38 to and from the first shaft 72 based on the input signal(s).

III. Alternative Embodiments

While certain embodiments of the invention are described above, it should be understood that the invention can be embodied and configured in many different ways without departing from the spirit and scope of the invention.

For example, embodiments are disclosed above in the context of the shaft 72 being located in the front final drive assembly 32 of FIGS. 2-5 that is located adjacent to the front end of the vehicle 10. However, embodiments are intended to include or otherwise cover any housed location for a shaft having a breaking region such as the breaking region 110 of the first shaft disclosed above. For example, the rear final drive assembly 34 can include a shaft that includes a breaking region configured in the manner of the breaking region of 110 of the first shaft 72 of the front final drive assembly 32 of FIGS. 2-5.

In another alternate embodiment where the shaft axis SA of the first shaft 72 is aligned with the shaft axis of the propeller shaft 28, second universal joint assembly 42 can be omitted and the propeller shaft 28 can be connected to the directly to the front input shaft 38.

In another alternate embodiment, the propeller shaft 28 can include more or less shaft sections or more or less universal joints. In another exemplary embodiment the propeller shaft 28 can be a single shaft that extends continuously from the transmission 26 to the front final drive assembly 30 such that all of the universal joints can be omitted.

In another alternate embodiment, the transmission 26 can be connected to either of the final drive assemblies 32, 34 by a shaft configured with a breaking region 110 that is contained within a housing.

The first shaft 72 is shown as a solid member made from a metal alloy such as but not limited to steel, aluminum, magnesium, of titanium, or non-metallic material such as but not limited to carbon fiber, ceramic, or other material that effectively transmits a torque load. It is contemplated that the first shaft 72 could be made from several materials, and includes coatings or layers of different materials. The material make-up of the shaft can contribute to the predetermined break point for the first shaft 72 as described above located in the breaking region 110. For example, a weld location, or a different material section, of the first shaft 72 can constitute the breaking region 110. Further, if the first shaft 72 is hollow, the breaking region 110 can include a concavity on an inner surface (or both the inner and outer surface) of the hollow shaft that causes the first shaft 72 to break at a predetermined torque load. Thus, the exterior surface of the first shaft 72 could constitute a continuous smooth surface that does not include a reduced diameter portion when a circumferential concavity is located on an inner surface of the first shaft 72.

In another alternate embodiment, the housing 68 can include a first half housing and second half housing that enclose a space in which the intermediate coupling assembly 64 and the front differential drive assembly 66 are contained.

Alternate embodiments can include the end cap assembly 146 configured as an elastic/resilient structure that engages each of the first housing section 90 and the front input shaft 38. Alternatively, the end cap assembly 146 can include structure in addition to an elastic/resilient seal structure.

However, the above alternative embodiments are merely provided for exemplary purposes, and as indicated above, embodiments are intended to cover any type of final drive assembly and any type of powertrain assembly that includes a final drive assembly disclosed above.

What is claimed is:

1. A front final drive assembly for a vehicle comprising:
   a housing; and
   a first shaft rotatably supported inside the housing and including a breaking portion such that when a reaction torque applied to the first shaft exceeds a predetermined threshold the first shaft fractures at the breaking portion, the breaking portion is a reduced diameter portion, and the breaking portion is positioned inside the housing; and
   a front differential drive assembly mounted inside the housing and including,
      an input shaft connected to and driven by the first shaft,
      an pinion gear connected to the input shaft and rotatable about a first axis,
      a bevel gear driven by the pinion gear and rotatable about a second axis that is substantially perpendicular to the first axis,
      a differential input structure connected to and driven by the bevel gear, and
      a differential output structure connected to and drivable by the differential input structure such that the differential output structure rotates in unison with the differential input structure in a first mode and the differential input structure rotates at a different speed relative to the differential output structure in a second mode.

2. The front final drive assembly for a vehicle according to claim 1, wherein the first shaft includes:
   a first support portion that is rotatably supported inside the housing; and
   a second support portion that is rotatably supported inside the housing, the second support portion is spaced away from the first support portion, and
   the breaking region is located between the first support portion and the second support portion.

3. The front final drive assembly for a vehicle according to claim 1, wherein
   the first shaft includes a first end, a second end, a plurality of splines adjacent to the second end, and a bearing portion spaced away from the first end and rotatably supported by the housing, and
   the breaking portion is located between the bearing portion and the splines.

4. The front final drive assembly for a vehicle according to claim 1, wherein
   the first shaft includes a plurality of external splines, each of the splines has a minor root diameter,
   the reduced diameter portion has a reduced diameter that is less than the minor root diameter of the splines.

5. The front final drive assembly for a vehicle according to claim 4, wherein the first shaft has an outer surface, and the breaking portion is a concavity that extends around a circumference of the outer surface such that the reduced diameter is measured at a base of the concavity.

6. The front final drive assembly for a vehicle according to claim 1, further comprising:
   a second shaft extending into the housing; and
   a clutch assembly mounted in the housing, the clutch assembly is configured to selectively connect and disconnect the first shaft to the second shaft.

7. The front final drive assembly for a vehicle according to claim 6, wherein
   the housing includes a first end, a second end, a first opening in the first end, and second opening in the second end,
   the first shaft is spaced away from the second opening,
   the second shaft extends through the second opening and into the housing, and
   the breaking portion is spaced away from each of the first opening and the second opening.

8. The front final drive assembly for a vehicle according to claim 6, further comprising:
   a first bearing rotatably supporting the first shaft adjacent the housing; and
   a second bearing rotatably supporting the second shaft adjacent the housing, wherein
   the breaking portion is located between the first bearing and the second bearing in an axial direction of the first shaft.

9. The front final drive assembly for a vehicle according to claim 6, further comprising a yoke connected to the second shaft at a location that is outside of the housing.

10. The front final drive assembly for a vehicle according to claim 6, wherein
    the first shaft includes a first end, a second end, and a plurality of external splines mating with the clutch assembly, the external splines are located between the breaking portion and the second end.

11. The front final drive assembly for a vehicle according to claim 1, wherein
    the housing includes:
       a first housing section including a first opening and a second opening;
       a second housing section including a third opening; and
       a third housing section,
    the first shaft includes a first end and a second end, the first shaft extends through first opening and the third opening such that the first end of the first shaft is located inside the second housing section and the second end of the first shaft is located in the first housing section,
    the second shaft includes a first end and a second end, the second shaft extends through the second opening such that the first end of the second shaft is located inside the first housing section and the second end is located outside of the housing, and
    the pinion gear and the input shaft are located inside the second housing.

12. The front final drive assembly for a vehicle according to claim 11, further comprising an annular end cap assembly in the second opening, the second shaft passes through the end cap assembly, and the end cap assembly and the second shaft together close the second opening.

13. A powertrain for a vehicle having a front end and a rear end spaced apart in a longitudinal direction of the vehicle, the powertrain comprising:
    an engine configured to produce an output torque;
    a transmission connected to the engine and configured to receive the output torque and convert the output torque to a drive torque;

a propeller shaft connected to the transmission and configured to transmit the drive torque;

a final drive assembly configured to output the drive torque to a pair of wheels, the final drive assembly includes, a housing;

a differential drive assembly mounted inside the housing; and a first shaft rotatably supported inside the housing and connected to the differential drive assembly and the propeller shaft such that the first shaft transmits the drive torque from the propeller shaft to the differential drive assembly, the first shaft including a breaking portion configured such that when a reaction torque applied to the first shaft exceeds a predetermined threshold the first shaft fractures at the breaking portion before the propeller shaft fractures, the breaking portion is a reduced diameter portion, and the breaking portion is housed inside the housing;

a first driveshaft selectively driven by the differential drive assembly; and a second driveshaft selectively driven by the differential drive assembly, the differential drive assembly configured to drive the first driveshaft and the second driveshaft in unison in a first mode and at different relative rotational speeds in a second mode, wherein the first shaft includes solid structure and a plurality of external splines on the solid shaft, the solid structure extends continuously between diametrically opposed locations on an outer surface of the shaft, and the breaking portion is located on the solid structure.

14. The powertrain according to claim 13, wherein the final drive assembly is a front final drive assembly located adjacent to the front end of the vehicle, the pair of wheels are a pair of front wheels located adjacent the front end of the vehicle, and the transmission is configured to output a rear drive torque in addition to the drive torque; and the powertrain further comprises:

a rear final drive assembly located adjacent to the rear end of the vehicle, the rear final drive assembly is connected to the transmission such that the rear final drive assembly receives the rear drive torque from the transmission, and the rear final drive assembly is configured to output at least a portion of the rear drive torque to a pair of rear wheels located adjacent to the rear end of the vehicle;

a first rear driveshaft selectively driven by the rear final drive assembly; and a second rear driveshaft selectively driven by the rear final drive assembly.

15. The powertrain according to claim 14, wherein the first shaft includes a first end, a second end, and a plurality of external splines adjacent to the second end, and the breaking portion is located between the external splines and the first end.

16. The powertrain according to claim 13, further comprising:

a second shaft connected to the propeller shaft and extending into the housing; and a clutch assembly mounted inside the housing, the clutch assembly is configured to selectively connect the first shaft to the second shaft.

17. The powertrain according to claim 13, wherein the first shaft includes a plurality of external splines, each of the splines has a root diameter, the reduced diameter portion has a reduced diameter that is less than the root diameter.

18. The powertrain according to claim 17, wherein the first shaft has an outer surface, and the breaking portion is a concavity that extends around a circumference of the outer surface such that the reduced diameter forms a base of the concavity.

* * * * *